(12) United States Patent
Van Essen et al.

(10) Patent No.: US 12,654,239 B2
(45) Date of Patent: Jun. 16, 2026

(54) STEP DRILL BIT

(71) Applicant: MILWAUKEE ELECTRIC TOOL CORPORATION, Brookfield, WI (US)

(72) Inventors: James J. Van Essen, Hales Corners, WI (US); Jacob A. Krabbe, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 519 days.

(21) Appl. No.: 18/006,001

(22) PCT Filed: Jul. 23, 2021

(86) PCT No.: PCT/US2021/042939
§ 371 (c)(1),
(2) Date: Jan. 19, 2023

(87) PCT Pub. No.: WO2022/020704
PCT Pub. Date: Jan. 27, 2022

(65) Prior Publication Data
US 2023/0278113 A1      Sep. 7, 2023

Related U.S. Application Data

(60) Provisional application No. 63/055,431, filed on Jul. 23, 2020.

(51) Int. Cl.
B23B 51/00      (2006.01)

(52) U.S. Cl.
CPC ................................... B23B 51/009 (2013.01)

(58) Field of Classification Search
CPC ................................................... B23B 51/009
(Continued)

(56) References Cited

U.S. PATENT DOCUMENTS 2,353,315 A * 7/1944 Maze ...................... F16B 15/02
470/7
3,645,640 A * 2/1972 Zukas ...................... B23B 5/16
408/82
(Continued)

FOREIGN PATENT DOCUMENTS

CN        103624300 A * 3/2014 ........... B23B 51/009
DE        20211592 U1 * 5/2004 ........... B23B 51/009
(Continued)

OTHER PUBLICATIONS

Partial Supplementary European Search Report for Application No. 21847008.6 dated Jul. 17, 2024 (13 pages).
(Continued)

*Primary Examiner* — Robert F Long
(74) *Attorney, Agent, or Firm* — Michael Best & Friedrich LLP

(57)      ABSTRACT

A step drill bit including a shank extending along a bit axis and a body having a proximal end adjacent the shank and a distal end opposite the proximal end. The body includes a bit tip adjacent the distal end. The bit tip includes a diameter in a direction perpendicular to the bit axis. The body defines a plurality of axially stacked, progressively sized steps including a first step adjacent and a terminal step. Each step of the plurality of steps defines a length and a diameter. The step drill bit also includes at least one flute in the body. Each flute extends from the distal end to the proximal end. The step drill bit includes a cutting edge on the flute. A ratio of the diameter of the bit tip to the length for a majority of the plurality of steps is in a range from 1.0 to 1.5.

11 Claims, 8 Drawing Sheets

(58) Field of Classification Search

USPC .................... 408/1, 8–15, 67, 76, 145, 224

See application file for complete search history.

(56) References Cited

U.S. PATENT DOCUMENTS

| | | | |
|---|---|---|---|
| 4,582,458 A | | 4/1986 | Korb et al. |
| 5,466,100 A | * | 11/1995 | Ahluwalia ............ B23B 51/009 |
| | | | 408/226 |
| 5,472,298 A | * | 12/1995 | Mihai ................... B23B 31/005 |
| | | | 408/8 |
| 5,540,433 A | * | 7/1996 | Engstrom ............... F16L 45/00 |
| | | | 111/116 |
| 6,096,042 A | * | 8/2000 | Herbert .............. A61B 17/8891 |
| | | | 606/80 |
| 6,171,312 B1 | * | 1/2001 | Beaty ................... A61C 8/0089 |
| | | | 606/92 |
| 7,578,161 B1 | * | 8/2009 | Sizemore ............. B21D 41/021 |
| | | | 72/370.11 |
| 8,388,280 B1 | | 3/2013 | Ison et al. |
| 8,764,355 B2 | * | 7/2014 | Durfee ................. B23B 51/009 |
| | | | 408/233 |
| 9,731,358 B2 | | 8/2017 | Allen et al. |
| 10,252,351 B2 | | 4/2019 | Allen et al. |
| 10,695,845 B2 | | 6/2020 | Allen et al. |
| D936,117 S | | 11/2021 | Allen et al. |
| 11,273,501 B2 | | 3/2022 | Parendo et al. |
| 11,453,069 B2 | * | 9/2022 | Ward ................... B23B 51/009 |
| 12,397,384 B2 | * | 8/2025 | Wang .................... B23P 15/32 |
| 2004/0076483 A1 | | 4/2004 | Singh et al. |
| 2005/0135890 A1 | * | 6/2005 | Bauman ................. B23B 51/12 |
| | | | 408/239 R |
| 2006/0117915 A1 | * | 6/2006 | Hui ...................... B25B 13/102 |
| | | | 81/121.1 |
| 2009/0056407 A1 | * | 3/2009 | Greene ................... B25D 3/00 |
| | | | 72/481.1 |
| 2011/0083870 A1 | * | 4/2011 | McCarty, II .......... B25D 17/24 |
| | | | 173/162.1 |
| 2012/0207557 A1 | * | 8/2012 | Durfee ................. B23B 51/009 |
| | | | 408/223 |
| 2013/0189044 A1 | * | 7/2013 | Durfee ................... B23B 51/02 |
| | | | 408/214 |
| 2014/0023445 A1 | * | 1/2014 | Allen ................... B23B 51/009 |
| | | | 408/224 |
| 2014/0102265 A1 | * | 4/2014 | Looijen ................ B25B 15/005 |
| | | | 173/1 |
| 2014/0363244 A1 | * | 12/2014 | Allen ................. B23B 51/0081 |
| | | | 408/16 |
| 2014/0369776 A1 | * | 12/2014 | Durfee ................. B23B 51/009 |
| | | | 408/224 |
| 2015/0196343 A1 | * | 7/2015 | Donald ................. A61B 17/92 |
| | | | 606/100 |
| 2015/0266106 A1 | * | 9/2015 | Bozkurt ............... B23B 51/009 |
| | | | 408/57 |
| 2016/0238053 A1 | * | 8/2016 | Lajewardi ........... F16B 25/0052 |
| 2017/0129022 A1 | * | 5/2017 | Durfee ................. B23B 51/009 |
| 2017/0165766 A1 | * | 6/2017 | Van Essen ........... B23B 51/009 |
| 2017/0274461 A1 | * | 9/2017 | Mabuchi ................. B23B 51/02 |
| 2018/0163763 A1 | * | 6/2018 | Wright .................... F16B 19/14 |
| 2018/0257150 A1 | * | 9/2018 | Jia ......................... B23B 51/009 |
| 2019/0030620 A1 | | 1/2019 | Piper et al. |
| 2019/0309784 A1 | * | 10/2019 | Lajewardi .......... F16B 25/0052 |
| 2019/0329331 A1 | * | 10/2019 | Parendo ................. B23B 51/02 |
| 2019/0390700 A1 | * | 12/2019 | Iyer ..................... F16B 25/0068 |
| 2020/0222994 A1 | | 7/2020 | Allen et al. |
| 2021/0154749 A1 | * | 5/2021 | Parendo ................. B23B 51/02 |
| 2021/0197295 A1 | * | 7/2021 | Ward ................... B23B 51/009 |
| 2021/0316375 A1 | | 10/2021 | Parendo et al. |
| 2022/0047359 A1 | * | 2/2022 | Huwais ................ A61C 8/0006 |
| 2022/0118525 A1 | * | 4/2022 | Baxter ................... F16L 41/08 |
| 2022/0339714 A1 | * | 10/2022 | Kraus .................. B23B 51/009 |
| 2023/0054585 A1 | * | 2/2023 | Bernaden ................. B22F 7/06 |
| 2023/0256524 A1 | * | 8/2023 | Sato ......................... B23B 51/02 |
| | | | 408/230 |
| 2023/0294178 A1 | * | 9/2023 | Sugimoto ............. C23C 16/271 |
| | | | 408/145 |

FOREIGN PATENT DOCUMENTS

| | | | | |
|---|---|---|---|---|
| DE | 202010006336 U1 | * | 8/2010 | .......... B23B 51/009 |
| DE | 102018131237 A1 | | 6/2020 | |
| EP | 0806543 A1 | * | 11/1997 | ............ E21B 7/267 |
| JP | S618219 A | * | 1/1986 | |
| JP | S6412716 U | * | 1/1989 | |
| JP | 2001096416 A | * | 4/2001 | |
| JP | 2002079408 A | * | 3/2002 | |
| JP | 2003300109 A | * | 10/2003 | |
| JP | 2006055965 A | * | 3/2006 | ............ B23B 51/02 |
| JP | 2012035359 A | * | 2/2012 | ............ B23B 51/02 |
| JP | 2022023828 A | * | 2/2022 | |
| JP | 3242717 U | * | 7/2023 | |
| KR | 102419674 B1 | * | 7/2022 | ............... B28D 1/14 |
| WO | 2014197761 A1 | | 12/2014 | |
| WO | WO-2015194408 A1 | * | 12/2015 | ............ B23B 51/02 |
| WO | WO-2022025015 A1 | * | 2/2022 | ............ B23B 51/02 |

OTHER PUBLICATIONS

Ruko, "Step Drills," catalog publicly available at least as early as Jun. 2, 2011, pp. 59-68.

International Search Report and Written Opinion for Application No. PCT/US2021/042939 dated Nov. 8, 2021 (12 pages).

* cited by examiner

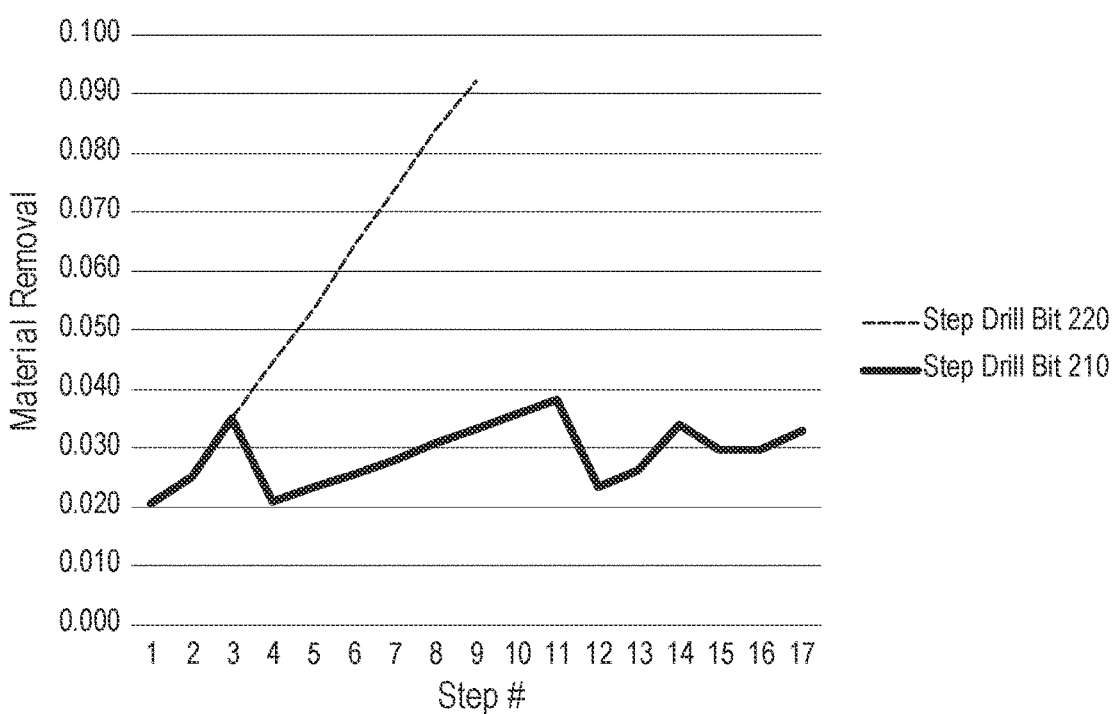
FIG. 5
| Add 8 step.  Below .04" | | | Total Length | 3.15 |
|---|---|---|---|---|
| Step Number | Step Diameter | Material removed | intermediate step length | 0.09 |
| 1 | 0.162 | 0.021 | Length increase | 0.72 |
| 2 | 0.241 | 0.025 | | |
| 3 | 0.32 | 0.035 | | |
| | 0.3595 | 0.021 | | |
| 4 | 0.399 | 0.024 | | |
| | 0.438 | 0.026 | | |
| 5 | 0.477 | 0.028 | | |
| | 0.5165 | 0.031 | | |
| 6 | 0.556 | 0.033 | | |
| | 0.5955 | 0.036 | | |
| 7 | 0.635 | 0.038 | | |
| | 0.658 | 0.023 | | |
| | 0.683 | 0.026 | | |
| 8 | 0.714 | 0.034 | | |
| | 0.74 | 0.030 | | |
| | 0.765 | 0.030 | | |
| 9 | 0.792 | 0.033 | | |
FIG. 6

| Add 6 steps, MR under .103, TL under 4" | | | Total Length | 3.943 |
|---|---|---|---|---|
| Step Number | Step Diameter | Material removed | intermediate step length | 0.09 |
| | 0.162 | 0.021 | Length increase | 0.45 |
| 1 | 0.261 | 0.033 | | |
| 2 | 0.34 | 0.037 | | |
| 3 | 0.418 | 0.046 | | |
| 4 | 0.497 | 0.057 | | |
| 5 | 0.576 | 0.067 | | |
| 6 | 0.655 | 0.076 | | |
| 7 | 0.733 | 0.085 | | |
| 8 | 0.812 | 0.096 | | |
| | 0.871 | 0.078 | | |
| 9 | 0.93 | 0.083 | | |
| | 0.9695 | 0.059 | | |
| 10 | 1.009 | 0.061 | | |
| | 1.068 | 0.096 | | |
| 11 | 1.127 | 0.102 | | |
| | 1.1665 | 0.071 | | |
| 12 | 1.206 | 0.074 | | |
| | 1.2455 | 0.076 | | |
| 13 | 1.285 | 0.079 | | |

| Add 6 step, keep tl under 4" | | | Total Length | 3.935 |
| --- | --- | --- | --- | --- |
| | | | intermediate step length | 0.09 |
| Step Number | Step Diameter | Material removed | Length increase | 0.54 |
| 1 | 0.162 | 0.021 | | |
| 2 | 0.241 | 0.025 | | |
| 3 | 0.32 | 0.035 | | |
| 4 | 0.399 | 0.045 | | |
| 5 | 0.477 | 0.054 | | |
| 6 | 0.556 | 0.064 | | |
| 7 | 0.635 | 0.074 | | |
| 8 | 0.714 | 0.084 | | |
| 9 | 0.792 | 0.092 | | |
| 10 | 0.871 | 0.103 | | |
| 11 | 0.95 | 0.113 | | |
| 12 | 0.9895 | 0.060 | | |
| 13 | 1.029 | 0.063 | | |
| 14 | 1.068 | 0.064 | | |
| 15 | 1.107 | 0.067 | | |
| | 1.1465 | 0.070 | | |
| | 1.186 | 0.072 | | |
| | 1.2255 | 0.075 | | |
| | 1.265 | 0.077 | | |
| | 1.305 | 0.081 | | |
| | 1.346 | 0.085 | | |
| | 1.383 | 0.079 | | |

Material Removed for Step Drill Bit

Step #

Step Drill Bit 420    Step Drill Bit 444
Step Drill Bit 430    Step Drill Bit 410

STEP DRILL BIT

CROSS REFERENCE TO RELATED APPLICATION

This application is a national stage filing under 35 U.S.C. § 371 of International Application No. PCT/US2021/042939, filed on Jul. 23, 2021, which claims the priority benefit of U.S. Provisional Patent Application Ser. No. 63/055,431, filed on Jul. 23, 2020, the entire contents of which are incorporated by reference herein.

BACKGROUND

The present invention relates to power tool accessories. More specifically, the present invention relates to step drill bits.

Step drill bits are used in a variety of applications and industries where a user may need to drill holes through a thin-walled work piece. A step drill bit allows a user to drill holes in a progressive range of sizes with a single bit. Step drill bits can be coupled to a power tool such as a drill or an impact driver.

SUMMARY

In one embodiment, the invention provides a step drill bit including a shank extending along a bit axis and a body having a proximal end adjacent the shank and a distal end opposite the proximal end. The body includes a bit tip adjacent the distal end. The bit tip includes a diameter in a direction perpendicular to the bit axis. The body defines a plurality of axially stacked, progressively sized steps including a first step adjacent the bit tip and a terminal step at the proximal end. Each step of the plurality of steps defines a length in a direction parallel to the bit axis and a diameter in a direction perpendicular to the bit axis. The step drill bit also includes a flute formed in the body. The flute extends from the distal end to the proximal end. The step drill bit further includes a cutting edge extending along the flute. A ratio of the diameter of the bit tip to the length for a majority of the plurality of steps is in a range from 1.0 to 1.5.

In another aspect, the length of each step is not equal between the first step and the terminal step.

In another aspect, the step drill bit has a length measured parallel to the bit axis between the distal end and the shank. The length is less than 4 inches.

In another aspect, the plurality of steps includes at least 13 steps.

In another aspect, the diameter of the tip is 0.125 inches.

In another aspect, the length of each step is at least 0.09 inches.

In another aspect, the terminal step defines a maximum diameter of the step drill bit.

In another aspect, wherein the maximum diameter is greater than 0.55 inches.

In another embodiment, the invention provides a step drill bit including a shank extending along a bit axis and a body having a proximal end adjacent the shank and a distal end opposite the proximal end. The body includes a bit tip adjacent the distal end. The body defines a plurality of axially stacked, progressively sized steps including a first step adjacent the bit tip and a terminal step at the proximal end. The plurality of steps include a plurality of stop-on steps and a plurality of intermediate steps. Each stop-on step includes a first length measured in a direction parallel to the bit axis. Each intermediate step includes a second length measured in a direction parallel to the bit axis. The first length is greater than the second length. The drill bit also includes a flute formed in the body extending from the distal end to the proximal end and a cutting edge extending along the flute.

In another embodiment, the invention provides a step drill bit including a shank extending along a bit axis and a body having a proximal end adjacent the shank and a distal end opposite the proximal end. The body includes a bit tip adjacent the distal end. The bit tip includes a diameter measured in a direction perpendicular to the bit axis. The body defines a plurality of axially stacked, progressively sized steps including a first step adjacent the bit tip and a terminal step at the proximal end. The step drill bit also includes a flute formed in the body. The flute extends from the distal end to the proximal end. The step drill bit further includes a cutting edge extending along the flute. The diameter of the bit tip is 0.125 inches and the plurality of steps includes at least 13 steps. The step drill bit has a length measured parallel to the bit axis between the distal end and the shank. The length is less than 4 inches.

Other aspects of the invention will become apparent by consideration of the detailed description and accompanying drawings.

BRIEF DESCRIPTION OF THE DRAWINGS

FIG. 5 is a graph of material removed per step for step drill bits.

FIG. 6 is a table of dimensions and performance statistics for a step drill bit.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. In addition, relative terms such as "approximately" and "about" should be understood to encompass the values listed and reasonable tolerances, such as manufacturing tolerances and/or rounding of the values.

DETAILED DESCRIPTION

Figures 1A, 1B:
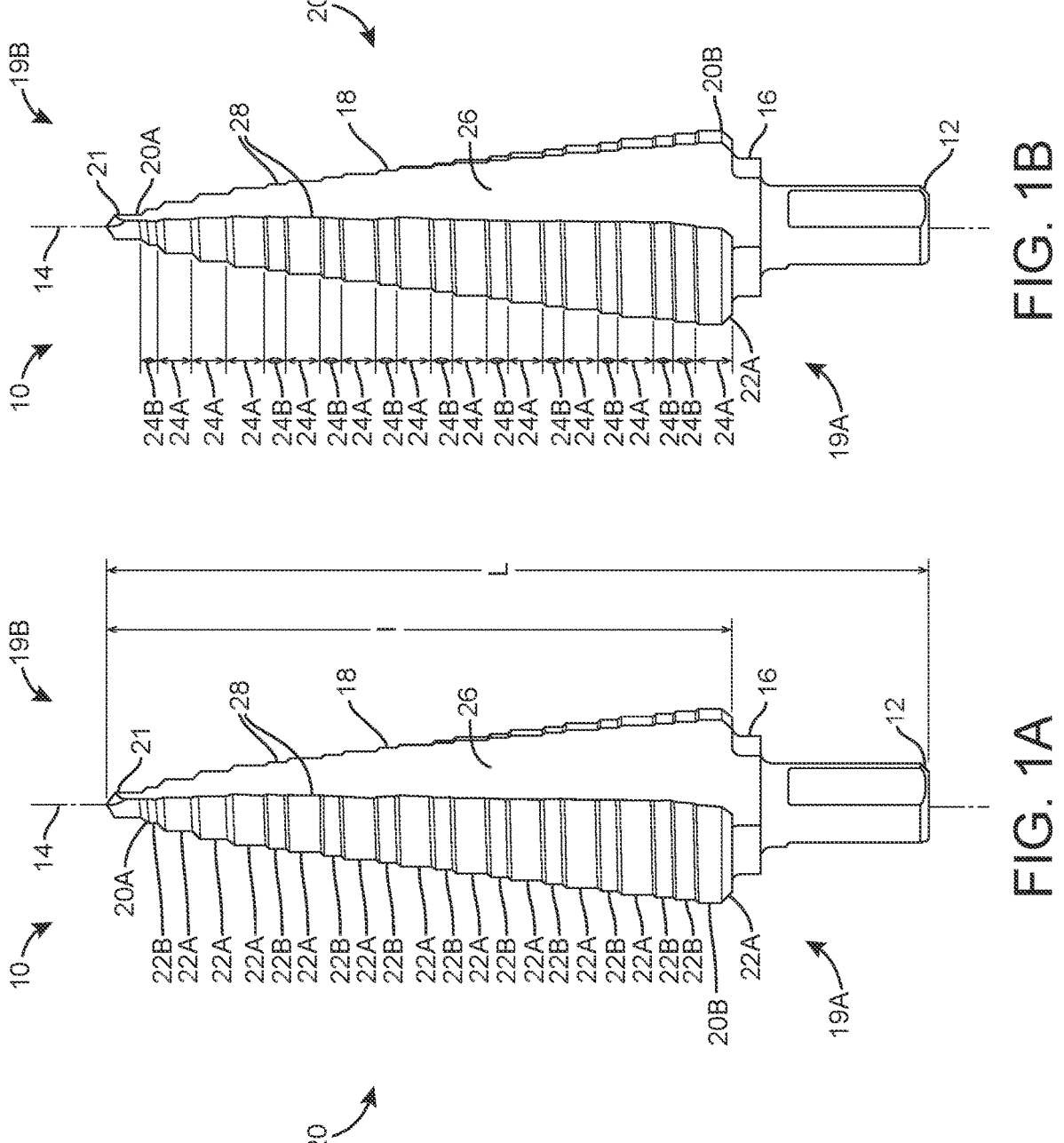
FIG. 1A is an elevation view of a step drill bit.
FIG. 1B is another elevation view of the step drill bit of FIG. 1A.

FIGS. 1A and 1B illustrate a step drill bit 10 for use with a power tool, such as, for example, a drill, a driver drill, an impact driver, and the like. The step drill bit 10 may be used to cut holes or drill into a workpiece such as sheet metal, wood, and the like. The illustrated step drill bit 10 comes in a variety of sizes that correspond to the type of hole to be drilled.

The step drill bit 10 includes a shank 12, a transition portion 16, and a body 18. The shank 12 is configured to engage a power tool for rotation of the step drill bit 10 about a bit axis 14. The shank 12 may be a hex-shaped shaft, a round shaped shank, a 3-flat type shank, or any other shank 12 that is configured to be coupled to a power tool. In the illustrated embodiment, the shank 12 has a diameter between approximately 0.125 inches to 0.3 inches. In some embodiments, an indication band may be located on the shank 12. The indication band may indicate to a user the type of the step drill bit 10. In further embodiments, the step drill bit 10 may include laser engravings that indicate to a user the size or type of step drill bit. The indication band may be a variety of colors such as red, green, blue, purple, orange, yellow, etc.

The illustrated bit axis 14 is a central longitudinal axis of the step drill bit 10. The transition portion 16 is defined between the shank 12 and the body 18. The body 18 includes a first or proximate end 19A adjacent the shank 12 and a second or distal end 19B opposite the proximate end 19A. The body 18 defines a length 1 that is measured in a direction parallel to the bit axis 14 between the proximate end 19A and the distal end 19B. In the illustrated embodiment, the length 1 of the body 18 is less than 4 inches. In other embodiments, the length 1 may be greater than or equal to 4 inches. Further, the step drill bit 10 defines a length L measured in a direction parallel to the bit axis 14 between the distal end 19B and an end surface of the shank 12. That is, the length L includes both the body 18 and the shank 12, while the length 1 only includes the body 18. In some embodiments, the length L is between 3 inches and 6 inches. Although, in other embodiments, the length L may be less than 3 inches or greater than 6 inches.

The body 18 defines a plurality of axially stacked, progressively sized steps 20 between a bit tip 21 and the transition portion 16. The steps 20 are axially stacked in that the steps 20 are coaxially arranged along the bit axis 14. In addition, the steps 20 are progressively sized in that the steps 20 incrementally increase in size (e.g., diameter) from the bit tip 21, or the distal end 19B of the body 18, to the transition portion 16, or the proximate end 19A. In some embodiments, the bit tip 21 may be defined as one of the plurality of steps 20 such that the bit tip 21 is a first step of the plurality of steps 20. In other embodiments, the bit tip 21 is a separate feature of the step drill bit 10. For example, the bit tip 21 may be referred to as a pilot tip to help position the step drill bit 10 during a drilling operation. In addition, the bit tip 21 includes a diameter measured in a direction perpendicular to the bit axis 14. The diameter of the bit tip 21 is in a range between 0.075 inches and 0.15 inches. In the illustrated embodiment, the diameter of the bit tip 21 is 0.125 inches or less.

The illustrated steps 20 include a first step 20A adjacent the bit tip 21 at the distal end 19B of the body 18 and a terminal step 20B coupled to the transition portion 16. The diameter of the terminal step 20B defines a max diameter of the step drill bit 10. The diameter of the terminal step 20B is greater than a diameter of the transition portion 16. The steps 20 located between the first and terminal steps 20A, 20B have incrementally increasing diameters within the range of 0.125 inches and 1 inch. In other embodiments, as further described below, the body 18 may include fewer or more steps, and/or each step 20 may have a different diameter.

In the illustrated embodiment, the plurality of steps 20 include a plurality of stop-on steps 22A and a plurality of intermediate steps 22B. The stop-on steps 22A correspond to commonly-used drill diameters (e.g., 0.5 inch, 0.75 inch, etc.). Each of the stop-on steps 22A has a length 24A. The lengths 24A are not required to be the same for all of the stop-on steps 22A. In the illustrated embodiment, the length 24A of each stop-on step 22A is in a range between 0.1 inch and 0.25 inches. Preferably, the length 24A of each stop-on step 22A is 0.155 inches.

The intermediate steps 22B are positioned between the stop-on steps 22A. It should be understood that the positioning of the intermediate steps 22B and the stop-on steps 22A are not required to be in a repeating pattern. Although, in some embodiments, the positioning of the intermediate steps 22B and the stop-on steps 22A may be in a pattern. Each of the intermediate steps 22B has a length 24B. The lengths 24B of the intermediate steps 22B are shorter than the lengths 24A of the stop-on steps 22A. The lengths 24B are not required to be the same for all of the intermediate steps 22B. In the illustrated embodiment, the length of each intermediate step 22B is in a range between 0.075 inches and 0.12 inches. Preferably, the length 24B of each intermediate step 22B is 0.09 inches. In some embodiments, the minimum length 24B of each intermediate step 22B is able to drill through 14 gauge stainless steel without engaging another step 20. In the illustrated embodiment, a ratio between the diameter of the bit tip 21 to the length 24B of the intermediate steps 22B is in a range between 1.0 and 1.5. In other embodiments, the ratio may be less than 1.0 or greater than 1.5.

The illustrated body 18 includes at least thirteen steps 20. In the illustrated embodiment, the plurality of steps 20 includes nine stop-on steps 22A and twelve intermediate steps 22B for a total of 21 steps 20. In other embodiments, the body 18 may include fewer or more steps 20. Additionally, the body 18 may include any combination of intermediate steps 22B and stop-on steps 22A between the first step 20A and the terminal step 20B.

As shown below in Table 1, each step of the plurality of steps 20 includes a diameter measured in a direction perpendicular to the bit axis 14 and a length. The diameter may range from approximately 0.125 inches to approximately 0.88 inches. Additionally, as discussed above, each length 24A of a stop-on step 22A is approximately 0.155 inches and each length 24B of an intermediate step 22B is approximately 0.09 inches. As evidenced by Table 1, the position of the intermediate steps 22B and the stop-on steps 22A are varied between the first step 20A and the terminal step 20B.

TABLE 1

| Step # | Diameter (in) | Step Length (in) |
|---|---|---|
| Bit Tip | 0.125 | 0.063 |
| 1 | 0.188 | 0.09 |
| 2 | 0.255 | 0.09 |
| 3 | 0.318 | 0.09 |
| 4 | 0.380 | 0.155 |
| 5 | 0.412 | 0.09 |
| 6 | 0.443 | 0.155 |
| 7 | 0.474 | 0.09 |
| 8 | 0.505 | 0.155 |
| 9 | 0.537 | 0.09 |
| 10 | 0.568 | 0.155 |
| 11 | 0.599 | 0.09 |

TABLE 1-continued

| Step # | Diameter (in) | Step Length (in) |
|--------|--------------|------------------|
| 12 | 0.630 | 0.155 |
| 13 | 0.662 | 0.09 |
| 14 | 0.693 | 0.155 |
| 15 | 0.724 | 0.09 |
| 16 | 0.755 | 0.155 |
| 17 | 0.787 | 0.09 |
| 18 | 0.818 | 0.155 |
| 19 | 0.840 | 0.09 |
| 20 | 0.865 | 0.09 |
| 21 | 0.880 | 0.155 |

Figure 1C:
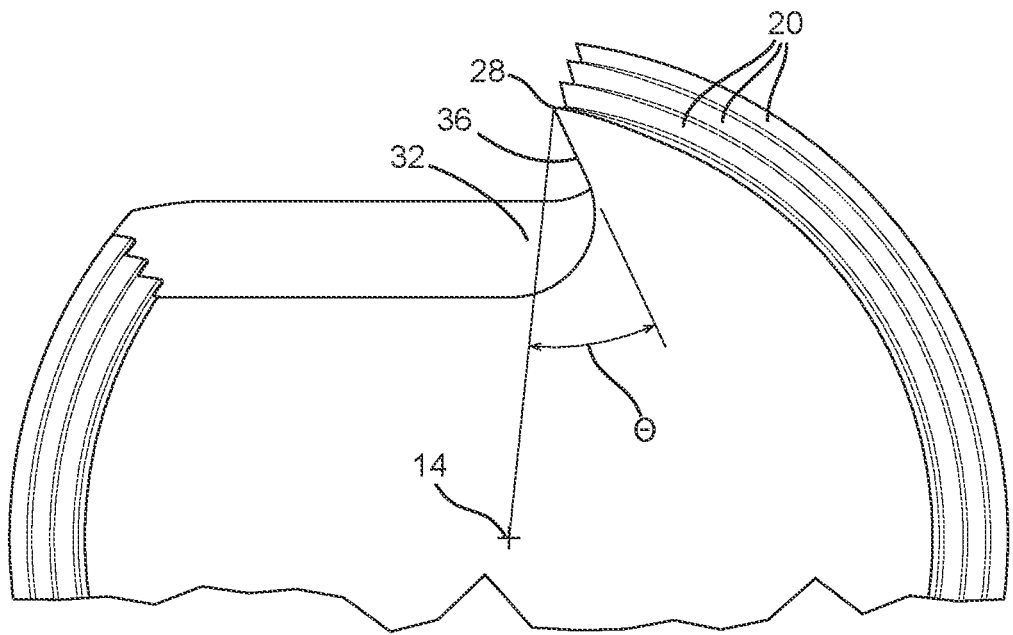
FIG. 1C is a cross sectional view of a portion of the step drill bit of FIG. 1A.

The body 18 of the step drill bit 10 further includes a flute 26 or groove that defines a cutting edge 28 of the step drill bit 10. In the illustrated embodiment, the flute 26 is a straight flute. In other words, the flute 26 extends between the distal end 19B and the proximal end 19A in a direction that is parallel to the bit axis 14. In other embodiments, the flute 26 may extend helically between the distal end 19B and the terminal end 19A. Further, in the illustrated embodiment, the step drill bit 10 includes two flutes 26. Although, in other embodiments, the step drill bit 10 may include a single flute 26 or more than two flutes 26. As shown in FIG. 1C, each step 20 of the plurality of steps 20 includes a rake angle Θ. The rake angle Θ is defined by a plane 32 extending between the bit axis 14 and the cutting edge 28 and a cutting face 36 adjacent the cutting edge 28.

Figure 3:
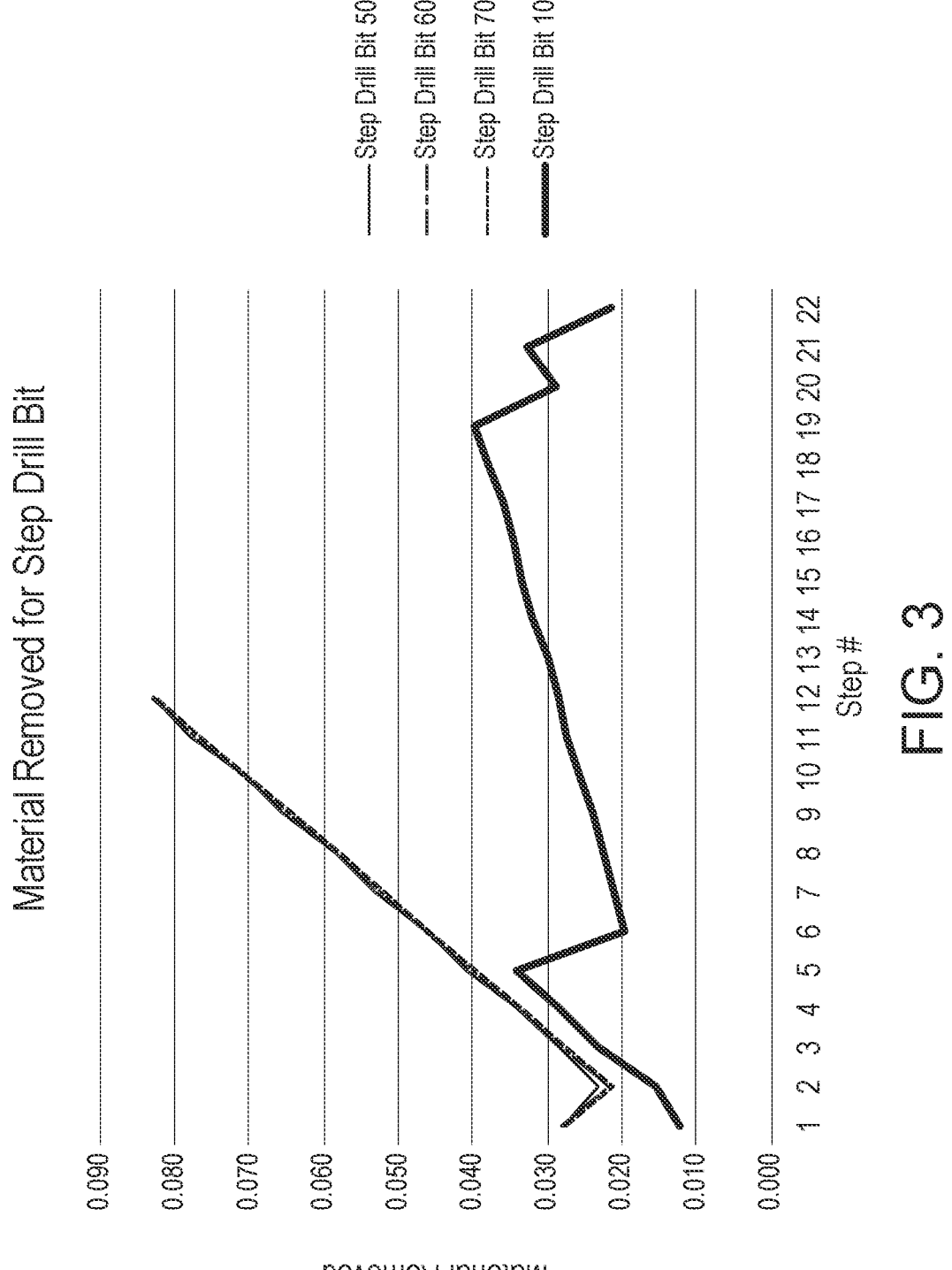
FIG. 3 is a graph of material removed per step for step drill bits.

FIG. 3 illustrates a graph of the amount of material removal per step for various step drill bits of the same maximum diameter. For example, a first conventional step drill bit 50 that is similar to the step drill bit 10 described above but does not include intermediate steps 22B, removes an increasing amount of material per step. Similarly, a second conventional step drill bit 60 (manufactured by Irwin Tools) and a third conventional step drill bit 70 (manufactured by Greenlee) remove approximately the same amount of material per step as the first conventional step drill bit 50. However, the step drill bit 10 removes material at a much lower amount per step than compared to the other conventional step drill bits 50, 60, 70. It has been found that removing less material per step increases the life of a step drill bit.

Providing a step drill bit 10 with intermediate steps 22B between stop-on steps 22A allows for less material removal per step. The intermediate steps 22B assist in lowering the load that the stop-on steps 22A experience when the stop-on steps 22A come in contact with a work piece during a drilling operation. Lowering the load on each step 20 increases the life of each step 20. As such, the cutting edges 28 of the step drill bit 10 are more wear resistant and able to withstand more drilling operations.

For example, Table 2 below, illustrates the mean number of holes before failure for the step drill bits 10, 50. During testing, the step drill bits 10, 50 were used with a power tool at full speed to produce holes in 14 gauge stainless steel. A cutting fluid was also used as a lubricant to reduce friction. Failure was determined to occur when the drill bits 10, 50 would take over 70 seconds to cut a hole three consecutive times or the stainless steel would melt during a test three consecutive times. As evidenced by Table 2, the number of holes until failure for the step drill bit 10 with intermediate steps is on average 25 times greater than the step drill bit 50 without any intermediate steps.

TABLE 2

| Number of Holes Produced Before Failure | |
|-------------------------|-------------------------|
| Step Drill Bit 10 | Step Drill Bit 50 |
| 51 | 2 |

Figures 2A, 2B:
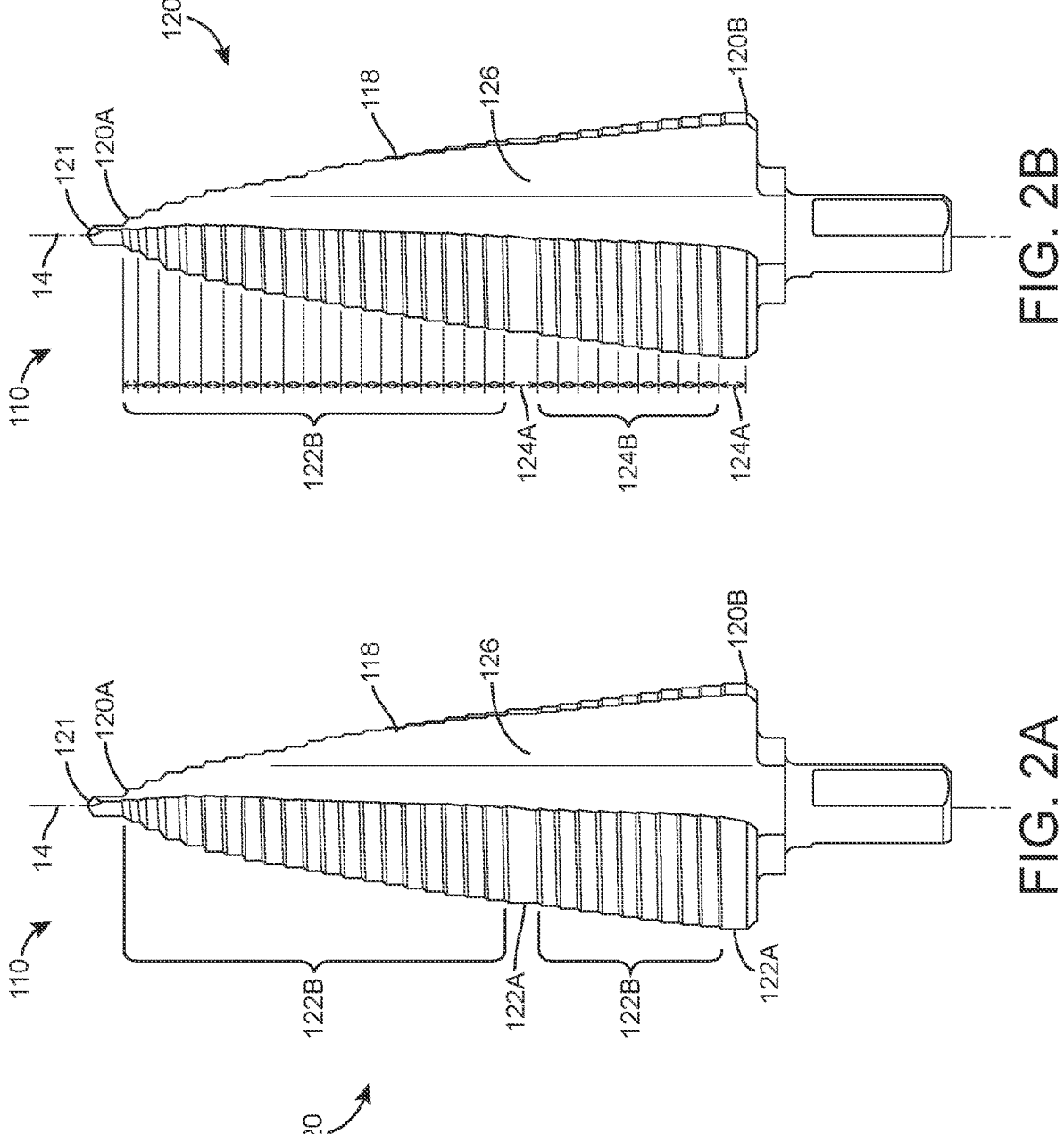
FIG. 2A is an elevation view of a step drill bit according to another embodiment.
FIG. 2B is another elevation view of the step drill bit of FIG. 2A.

FIGS. 2A and 2B illustrate a step drill 110 bit according to another embodiment of the invention. The step drill bit 110 includes features similar to the step drill bit 10 of FIGS. 1A and 1B, and like features have been given like reference numbers plus 100. The step drill bit 110 may include any combination of features, dimensions, or range of dimensions from the preceding embodiment. But only features of the step drill bit 110 not yet discussed with respect to the previous embodiment are detailed below.

The step drill bit 110 includes two flutes 126, a bit tip 121, and a plurality of axially stacked progressively sized steps 120. A first step 20A has a diameter of approximately 0.188 inches, and a terminal step 120B has a diameter of approximately 1.125 inches. The plurality of steps 120 include a plurality of stop-on steps 122A and a plurality of intermediate steps 122B.

Similar to the step drill bit 10, each of the stop-on steps 122A of the step drill bit 110 has a length 124A. The lengths 124A are not required to be the same for all of the stop-on steps 122A. In the illustrated embodiment, the length 124A of each stop-on step 122A is in a range between 0.1 inch and 0.25 inches. Preferably, the length 124A of each stop-on step 122A is approximately 0.15 inches. Each of the intermediate steps 122B has a length 124B. The lengths 124B are not required to be the same for all of the intermediate steps 122B. In the illustrated embodiment, the length 124B of each intermediate step 122B is in a range between 0.075 inches and 0.12 inches. Preferably, the length 124B of each intermediate step 122B is approximately 0.09 inches. In some embodiments, the minimum length 124B of each intermediate step 122B is able to drill through 14 gauge stainless steel without engaging another step.

The body 118 includes at least thirteen steps. In the illustrated embodiment, the plurality of steps 120 includes two stop-on steps 122A and 28 intermediate steps 122B for a total of 30 steps. In other embodiments, the body 118 may include fewer or more steps 20. Additionally, the body 118 may include any combination of intermediate steps 122B and stop-on steps 122A between the first step 120A and the terminal step 120B.

As shown below in Table 3, each step of the plurality of steps 20 includes a diameter measured in a direction perpendicular to the bit axis 14 and a length. The diameter may range from approximately 0.125 inches to approximately 1.125 inches. Additionally, as discussed above, each length 124A of a stop-on step 122A is approximately 0.15 inches and each length 124B of an intermediate step 122B is approximately 0.09 inches.

TABLE 3

| Step # | Diameter (in) | Step Length (in) |
|--------|--------------|------------------|
| Bit Tip | 0.125 | 0.063 |
| 1 | 0.188 | 0.090 |
| 2 | 0.250 | 0.090 |
| 3 | 0.320 | 0.090 |
| 4 | 0.390 | 0.090 |
| 5 | 0.425 | 0.090 |
| 6 | 0.460 | 0.090 |

TABLE 3-continued

| Step # | Diameter (in) | Step Length (in) |
|---|---|---|
| 7 | 0.495 | 0.090 |
| 8 | 0.530 | 0.090 |
| 9 | 0.565 | 0.090 |
| 10 | 0.600 | 0.090 |
| 11 | 0.633 | 0.090 |
| 12 | 0.665 | 0.090 |
| 13 | 0.698 | 0.090 |
| 14 | 0.730 | 0.090 |
| 15 | 0.760 | 0.090 |
| 16 | 0.790 | 0.090 |
| 17 | 0.815 | 0.090 |
| 18 | 0.840 | 0.090 |
| 19 | 0.858 | 0.090 |
| 20 | 0.875 | 0.150 |
| 21 | 0.902 | 0.090 |
| 22 | 0.928 | 0.090 |
| 23 | 0.955 | 0.090 |
| 24 | 0.981 | 0.090 |
| 25 | 1.008 | 0.090 |
| 26 | 1.034 | 0.090 |
| 27 | 1.058 | 0.090 |
| 28 | 1.082 | 0.090 |
| 29 | 1.104 | 0.090 |
| 30 | 1.125 | 0.150 |

Figure 4:
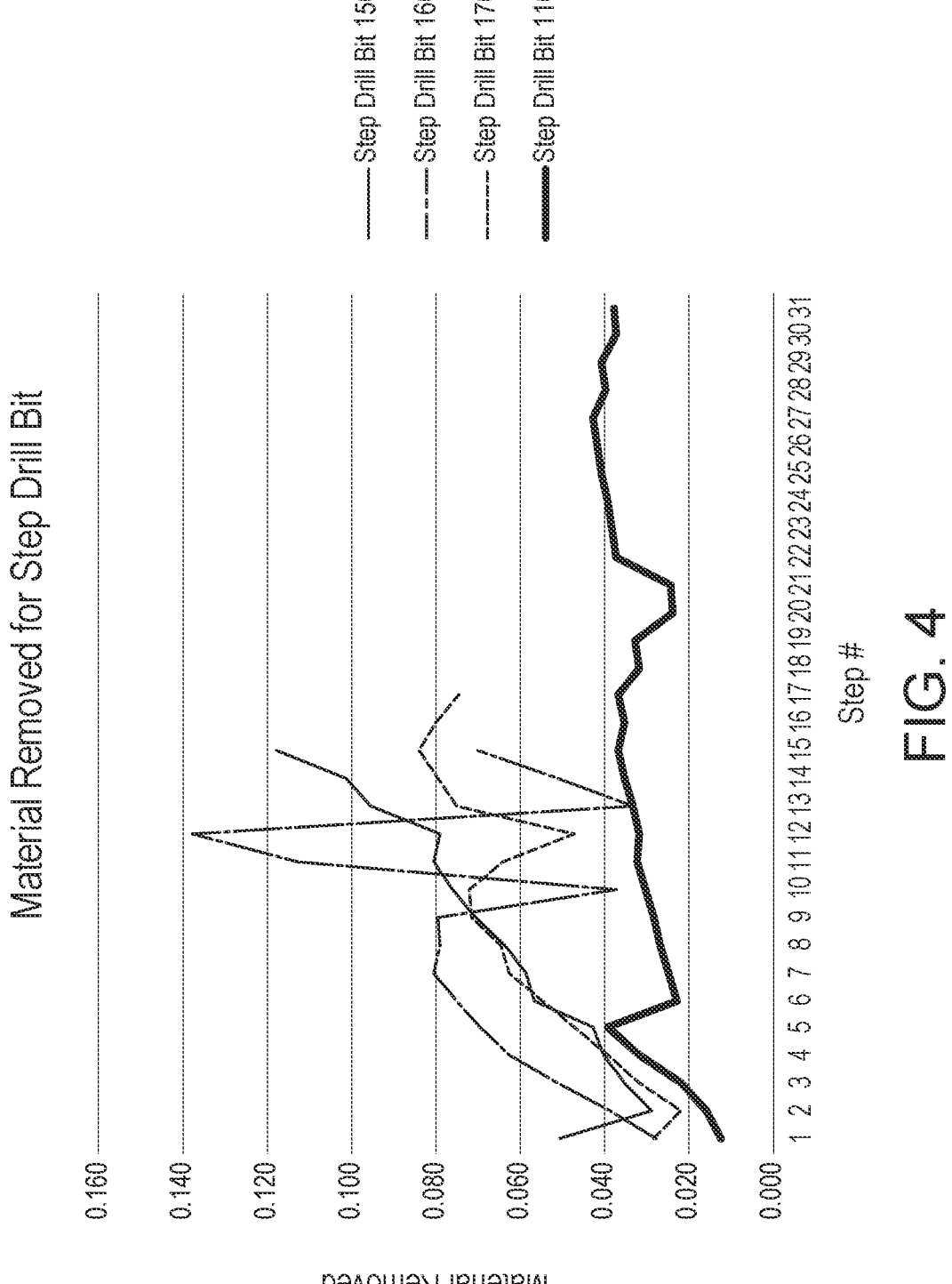
FIG. 4 is a graph of material removed per step for step drill bits.

FIG. 4 illustrates a graph of the amount of material removal per step for various step drill bits of the same maximum diameter. For example, a first conventional step drill bit 150 that is similar to the step drill bit 110 described above but does not include intermediate steps 122B, removes an increasing amount of material per step. Similarly, a second conventional step drill bit 160 (manufactured by Irwin Tools) and a third conventional step drill bit 170 (manufactured by Greenlee) remove approximately the same amount of material per step as the first conventional step drill bit 150. However, the step drill bit 110 removes material at a much lower amount per step than compared to the convention drill bits 150, 160, 170.

Table 4 below illustrates the mean number of holes before failure for the step drill bits 110, 150, 170. During testing, the step drill bits 110, 150, 170 were used with a power tool at full speed to produce holes in 14 gauge stainless steel. A cutting fluid was also used as a lubricant to reduce friction. Failure was determined to occur when the step drill bits 110, 150, 170 would take over 70 seconds to cut a hole three consecutive times or the stainless steel would melt during a test three consecutive times. As evidenced by the table, the number of holes until failure for the step drill bit 110 with intermediate steps is on average 14 times greater than the step drill bit 150 without any intermediate steps. In addition, the step drill bit 110 is about three times greater than the step drill bit 170.

TABLE 4

| Number of Holes Produced Before Failure | | |
|---|---|---|
| Step Drill Bit 110 | Step Drill Bit 150 | Step Drill Bit 170 |
| 42.8 | 3 | 13 |

FIG. 5 illustrates a graph of material removed per step for a step drill bit 210 of another embodiment. The step drill bit 210 is similar to the step drill bits 10, 110 discussed above and includes a plurality of steps having stop-on steps and intermediate steps. The step drill bit 210 includes steps that progressively increase in diameter from a first step that is approximately 4 mm (i.e., 0.162 inches) in diameter to a terminal step that is approximately 20 mm (i.e., 0.792 inches) in diameter. The step drill bit 210 includes eight stop-on steps and eight intermediate steps for a total of 16 steps. As shown in the graph, a first conventional step drill bit 220 which does not include intermediate steps removes a greater amount of material per step than the step drill bit 210 with intermediate steps.

FIG. 6 illustrates a table including features, dimensions, and performance statistics for the step drill bit 210 discussed above. Specifically, the table displays the step number, the diameter of each step, and the material removed per step. It should be noted that the steps labeled with a number are stop-on steps and the steps without a number are intermediate steps except for the first step which is a bit tip. As shown, the length of each intermediate step is approximately 0.09 inches and the total length between the first step and the terminal step is approximately 3.15 inches. The length of the intermediate steps combined add a total of approximately 0.72 inches to the length of the step drill bit 210.

Figures 7, 8:
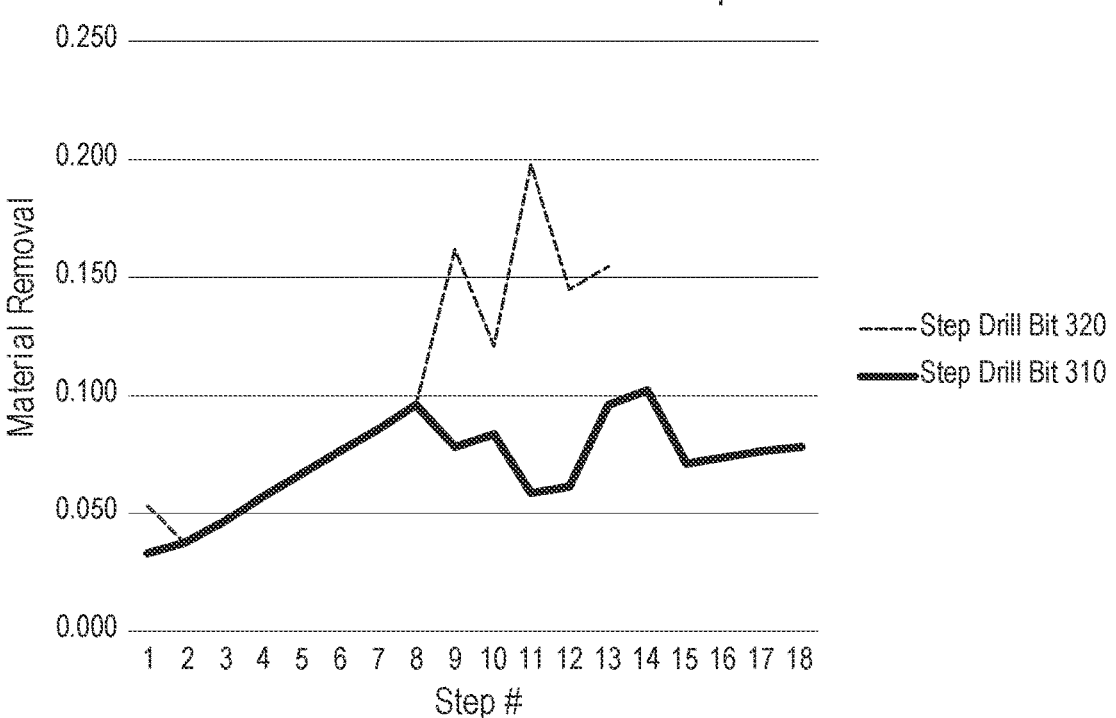
FIG. 7 is a graph of material removed per step for step drill bits.
FIG. 8 is a table of dimensions and performance statistics for a step drill bit.

FIG. 7 illustrates a graph of material removed per step for a step drill bit 310 of another embodiment. The step drill bit 310 is similar to the step drill bits 10, 110, 210 discussed above and includes a plurality of steps having stop-on steps and intermediate steps. The step drill bit 310 includes steps that progressively increase in diameter from a first step that is approximately 6 mm (i.e., 0.162 inches) in diameter to a terminal step that is approximately 32 mm (i.e., 1.285 inches) in diameter. The step drill bit 310 includes thirteen stop-on steps and five intermediate steps for a total of eighteen steps. As shown in the graph, a first conventional step drill bit 320 which does not include intermediate steps removes a greater amount of material per step than the step drill bit 310 with intermediate steps.

FIG. 8 illustrates a table including features, dimensions, and performance statistics for the step drill bit 310 discussed above. Specifically, the table displays the step number, the diameter of each step, and the material removed per step. It should be noted that the steps labeled with a number are stop-on steps and the steps without a number are intermediate steps, except the step at the top that is not labeled which is a bit tip. As shown, the length of each intermediate step is approximately 0.09 inches and the total length between the first step and the terminal step is approximately 3.943 inches. The length of the intermediate steps combined add a total of approximately 0.45 inches to the length of the step drill bit 310.

Figures 9, 10:
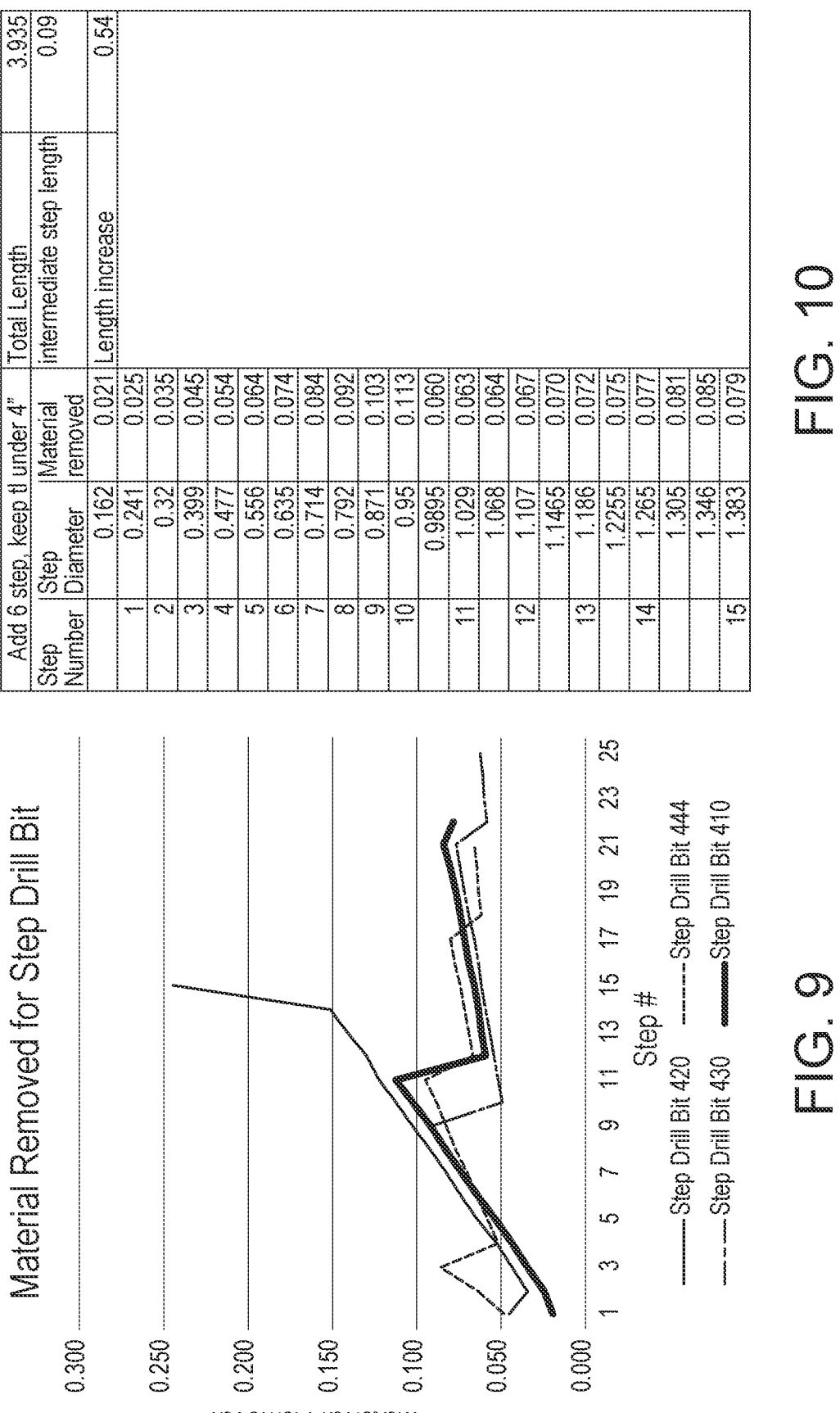
FIG. 9 is a graph of material removal per step for step drill bits.
FIG. 10 is a table of dimensions and performance statistics for a step drill bit.

FIG. 9 illustrates a graph of material removed per step for step drill bits with varying numbers of additional steps (e.g., intermediate steps). A first step drill 410 bit with six additional steps includes a plurality of steps having stop-on steps and intermediate steps. The first step drill 410 bit includes steps that progressively increase in diameter from a first step that is approximately 6 mm (i.e., 0.162 inches) in diameter to a terminal step that is approximately 35 mm (i.e., 1.383 inches) in diameter. The first step drill 410 bit includes fifteen stop-on steps and six intermediate steps for a total of nineteen steps. Additionally, the graph illustrates a second step drill bit 420 that includes nine additional steps and a third drill bit 430 that is extended in length. As shown in the graph, a first conventional step drill bit 440 which does not include intermediate steps removes a greater amount of material per step than the first, second, and third step drill bits 410, 420, 430 with intermediate steps.

FIG. 10 illustrates a table including features, dimensions, and performance statistics for the first step drill 410 bit discussed above. Specifically, the table displays the step number, the diameter of each step, and the material removed per step. It should be noted that the steps labeled with a number are stop-on steps and the steps without a number are intermediate steps, except the step not labeled at the top of the graph, which is a bit tip. As shown, the length of each intermediate step is approximately 0.09 inches and the total length between the first step and the terminal step is approximately 3.935 inches. The length of the intermediate steps combined add a total of approximately 0.54 inches to the length of the step drill bit 410.

Various features and advantages are set forth in the following claims.

What is claimed is:

1. A step drill bit comprising:

a shank extending along a bit axis;

a body having a proximal end adjacent the shank and a distal end opposite the proximal end, the body including a bit tip adjacent the distal end, the bit tip including a diameter measured in a direction perpendicular to the bit axis, the body defining a plurality of axially stacked, progressively sized steps including a first step adjacent the bit tip and a terminal step at the proximal end, the plurality of steps including a plurality of stop-on steps and a plurality of intermediate steps, each step of the plurality of steps defining a length measured in a direction parallel to the bit axis and a diameter measured in a direction perpendicular to the bit axis;

a flute formed in the body, the flute extending from the distal end to the proximal end; and a cutting edge extending along the flute;

wherein a majority of the plurality of steps are intermediate steps; and wherein a ratio of the diameter of the bit tip to the length for the majority of the plurality of steps is in a range from 1.0 to 1.5.

2. The step drill bit of claim 1, wherein the length of each step is not equal between the first step and the terminal step.

3. The step drill bit of claim 1, wherein the body has a length measured parallel to the bit axis between the distal end and the proximal end, and wherein the length is less than 4 inches.

4. The step drill bit of claim 1, wherein the plurality of steps includes at least 13 steps.

5. The step drill bit of claim 1, wherein the diameter of the tip is 0.125 inches.

6. The step drill bit of claim 1, wherein the length of each step is at least 0.09 inches.

7. The step drill bit of claim 1, wherein the terminal step defines a maximum diameter of the step drill bit.

8. The step drill bit of claim 7, wherein the maximum diameter is greater than 0.55 inches.

9. The step drill bit of claim 7, further comprising a transition portion defined between the shank and the body, the transition portion including a diameter that is smaller than the terminal step and greater than the shank.

10. The step drill bit of claim 1, wherein the diameters between steps incrementally increases between the first step and the terminal step.

11. The step drill bit of claim 1, wherein the flute extends in a direction that is generally parallel to the bit axis.

* * * * *